(12) United States Patent
Amela Conesa et al.

(10) Patent No.: US 11,652,926 B2
(45) Date of Patent: May 16, 2023

(54) METHOD AND APPARATUS FOR DIGITAL PRINTING THAT CALIBRATES MISALIGNMENT OF SUPER-POSITIONED INK LAYERS AT PLURAL LOCATIONS ON SAMPLE PRINT

(71) Applicant: Hewlett-Packard Development Company, L.P., Spring, TX (US)

(72) Inventors: Eduardo Amela Conesa, Sant Cugat del Valles (ES); Diana Canto Estany, Sant Cugat del Valles (ES); Marta Blanch Pinol, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/416,539

(22) PCT Filed: Jun. 26, 2019

(86) PCT No.: PCT/US2019/039311
§ 371 (c)(1),
(2) Date: Jun. 21, 2021

(87) PCT Pub. No.: WO2020/263251
PCT Pub. Date: Dec. 30, 2020

(65) Prior Publication Data
US 2022/0143985 A1 May 12, 2022

(51) Int. Cl.
*H04N 1/00* (2006.01)
*H04N 1/393* (2006.01)
*H04N 1/60* (2006.01)

(52) U.S. Cl.
CPC ..... *H04N 1/00023* (2013.01); *H04N 1/00068* (2013.01); *H04N 1/3935* (2013.01); *H04N 1/6038* (2013.01)

(58) Field of Classification Search
CPC .. H04N 1/00023; H04N 1/6038; B41J 2/2135
See application file for complete search history.

(56) References Cited

U.S. PATENT DOCUMENTS 8,014,033 B2  9/2011  Wang et al.
8,280,161 B2  10/2012  Dalal et al.
(Continued)

FOREIGN PATENT DOCUMENTS

JP  2010263313 A   11/2010
WO  WO-2018181166 A1  10/2018

*Primary Examiner* — Scott A Rogers (57) ABSTRACT

A method of digital printing is disclosed in which a digital image to be printed has at least one region having pixels comprising superpositioned layers of a first ink and a second ink. The method includes producing at least one sample print and calibrating misalignment of the superpositioned layers at a plurality of calibration locations on the sample print. The resultant misalignment data is provided to a morphing program to pre-deform the digital image to provide a modified digital image which compensates for misalignment during printing. The image is then printed using the modified digital image. An apparatus and a machine readable storage medium comprising instructions executable by a processor are also disclosed.

15 Claims, 6 Drawing Sheets

(56) References Cited

U.S. PATENT DOCUMENTS

| | | | |
|---|---|---|---|
| 8,564,834 B2 | 10/2013 | Lin et al. | |
| 8,896,892 B2 | 11/2014 | Wen et al. | |
| 9,016,824 B1 * | 4/2015 | Armbruster | B41J 2/2135 |
| | | | 347/15 |
| 9,033,445 B1 * | 5/2015 | Armbruster | H04N 1/506 |
| | | | 347/15 |
| 9,098,782 B2 | 8/2015 | Uratani et al. | |
| 9,545,796 B1 * | 1/2017 | Liston | H04N 1/00039 |
| 9,699,328 B1 * | 7/2017 | Liston | H04N 1/00015 |
| 9,922,274 B2 | 3/2018 | Corley | |
| 10,038,884 B2 | 7/2018 | Holub | |
| 2003/0210412 A1 | 11/2003 | Ishibashi | |
| 2015/0116734 A1 * | 4/2015 | Howard | B41J 2/2146 |
| | | | 358/1.4 |
| 2015/0116735 A1 * | 4/2015 | Howard | G06K 9/6201 |
| | | | 358/1.4 |
| 2015/0116736 A1 * | 4/2015 | Howard | B41J 2/2135 |
| | | | 358/1.4 |
| 2017/0374238 A1 | 12/2017 | Refael et al. | |
| 2019/0077143 A1 | 3/2019 | Krieger et al. | |

* cited by examiner

METHOD AND APPARATUS FOR DIGITAL PRINTING THAT CALIBRATES MISALIGNMENT OF SUPER-POSITIONED INK LAYERS AT PLURAL LOCATIONS ON SAMPLE PRINT

BACKGROUND

Advanced digital print systems may include an inkset having a set of color inks (for example a four-color set, CMYK, or a six-color set CMYKcm) and a white ink. A white ink is useful in enabling print on a wider variety of media substrates including colored or transparent media. Such digital print systems may, for example, be used to print flexible or rigid media including applications for retail, outdoor signage, window graphics, events and exhibitions, and decorations.

Particularly when printing on color or transparent media an option is to use a white ink layer which is superpositioned with colored inks in the same pixels. Thus, the white layer may provide enhanced color reproduction in the final print. The white layer may be provided as either an underflood, when the white layer is below the color, or an overflood, when the white layer is printed on top of the color layer. Since the pixels of the print layers are superpositioned any misalignment in the layers may have a direct impact upon the final image quality. For example, artifacts of the overflood or underflood layer may become visible around the edges of an image due to misalignment. Misalignment may occur as a result of several issues including, for example, media deformations (which may be due to heat of the print process) or mechanical variations.

One way to improve such misalignment image quality issues is to apply a "choke" to the overflood or underflood layer which shrinks the image in that layer with respect to the color layer. This may prevent visible artifacts of the layer but can also result in lower image quality if the under/over layer is over shrunk leaving areas of the color layer without an under/over flood.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
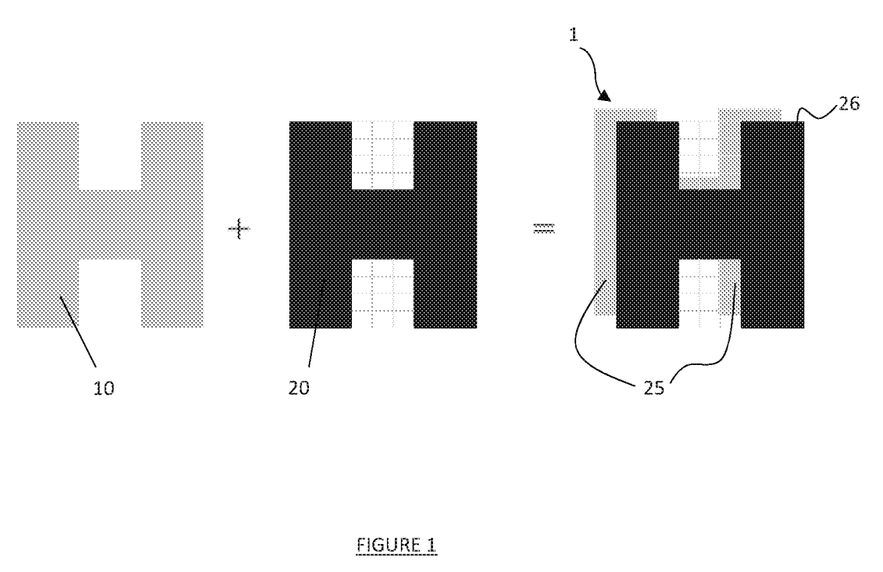
FIG. 1 shows an example of image artifacts that may occur if the registration of the superpositioned pixels of the white and color layers is misaligned.

An illustrative example of image artifacts that may occur when printing with an overflood or underflood is shown in FIG. 1. The image 1 to be printed includes two layers 10 and 20 which each comprise a plurality of pixels which are intended to be superpositioned upon one another. One layer may be white layer 10 and the other layer may be a color layer 20. It may, however, be appreciated that other layer configurations are possible, and the examples provided herein may be applied to any arrangement having layers which are superpositioned. Further, in some cases more than two layers may be present. For example, an image could be formed with a color-white-color layer make up.

Areas of white edging 25 appear around parts of the image providing an unwanted white outline of parts of the image (in this case the letter "H"). As mentioned above, this effect can be reduced by shrinking the white layer with a "choke" function. However, whilst a choke function may be acceptable in some situations it may result in areas of the image, such as the right most strip 26 of the image 25 in FIG. 1, having an increased area without a white underflood or overflood. This can result in its own visible artifacts in the form of miscolored sections in any areas where the white layer is absent.

Figure 2A:
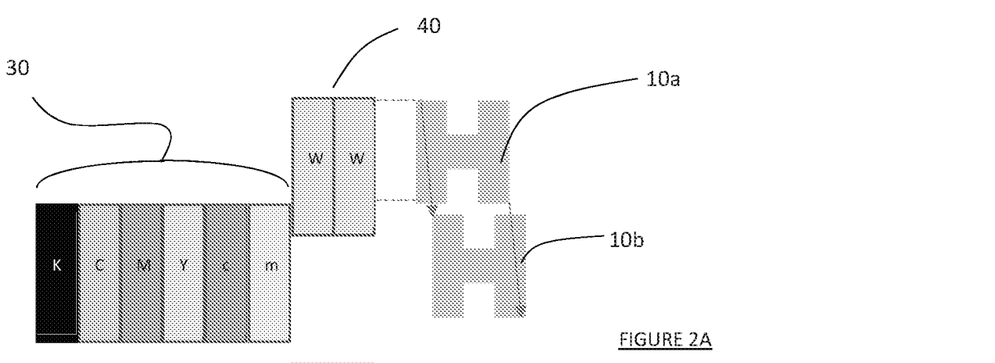
FIG. 2 is a schematic representation of the carriage configuration of a digital print system for use in an example of the disclosure.
Figure 2B:
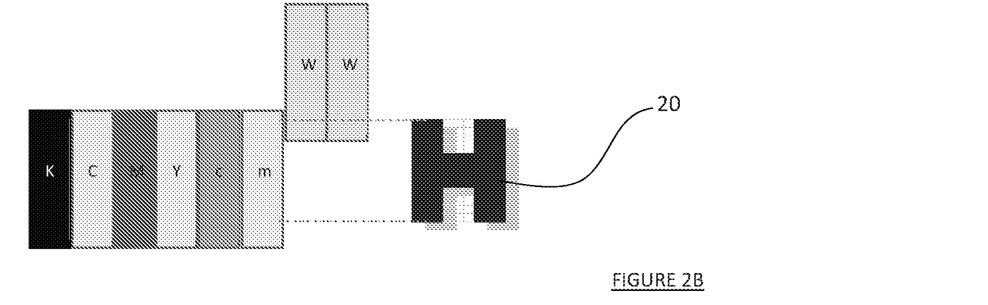

As shown in FIG. 2A, a digital printer for use in examples may include print heads in a carriage configuration which includes a set of color print heads 30 which are aligned with one another relative to the print media. The white print head or heads 40 may be separately aligned and staggered relative to the color heads 30. Thus, the white layer of the image may be printed on the media in the desired location 10a when it is aligned with the white head(s) 40. The media then advances relative to the printer moving the printed image towards the position aligned with the color print heads 30 as shown by the image advanced to location 10b. During the movement between the positions 10a and 10b the advancement of the image (as illustrated by the arrows in FIG. 2A) may have a degree of error. As such, when the color print heads 30 lay the subsequent layer 20 onto the media as shown in FIG. 2B there is a slight misalignment between the pixels of the layers 10 and 20.

There may be several possible causes of the error during the movement of the print media. For example, there may be mechanical variations in a printer or in the movement of the media through the printer. Many digital print systems are intended to handle a wide range of media type and this may result in some variation from one material type to another. One particular issue with some materials may be physical deformations of the media which result from the print process itself, for example as a result of the heating and cooling of the media during the process. Such issues may, for example, be notable with plastic media substrates which may include materials such as latex, vinyl, polyester (which may include, without limitation PET or textile) or polypropylene. For example, in latex products a factor in final image quality may be the correct dry and cure of the ink as a result of printzone and curing heat. As there are several variables which may impact the deformation of the print media the resulting misalignment may be non-uniform. For example one or more of the following may be a variable in the alignment the position of the print element on the axis of the media, the scan axis of the printer, variations in the composition of the media or with respect to the time (for example the heating effects of the media may vary with time through the print process).

Figure 3:
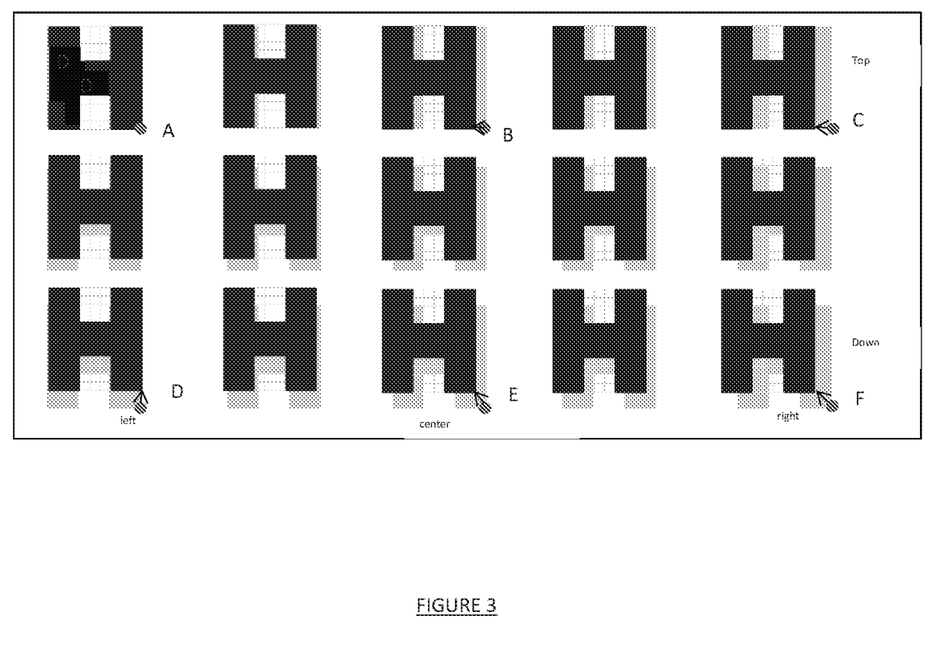
FIG. 3 is a schematic representation of a print having a misaligned white print layer.

FIG. 3 shows an example of an image in which a misalignment varies across the image along both axis of the media (and it may be appreciated that the error shown in the figure is generally exaggerated for clarity). The present disclosure provides a method of digital printing which may address such non-uniform misalignment. The method may apply to any digital image having at having at least one region having pixels comprising superpositioned layers of a first ink and a second ink.

Figure 4:
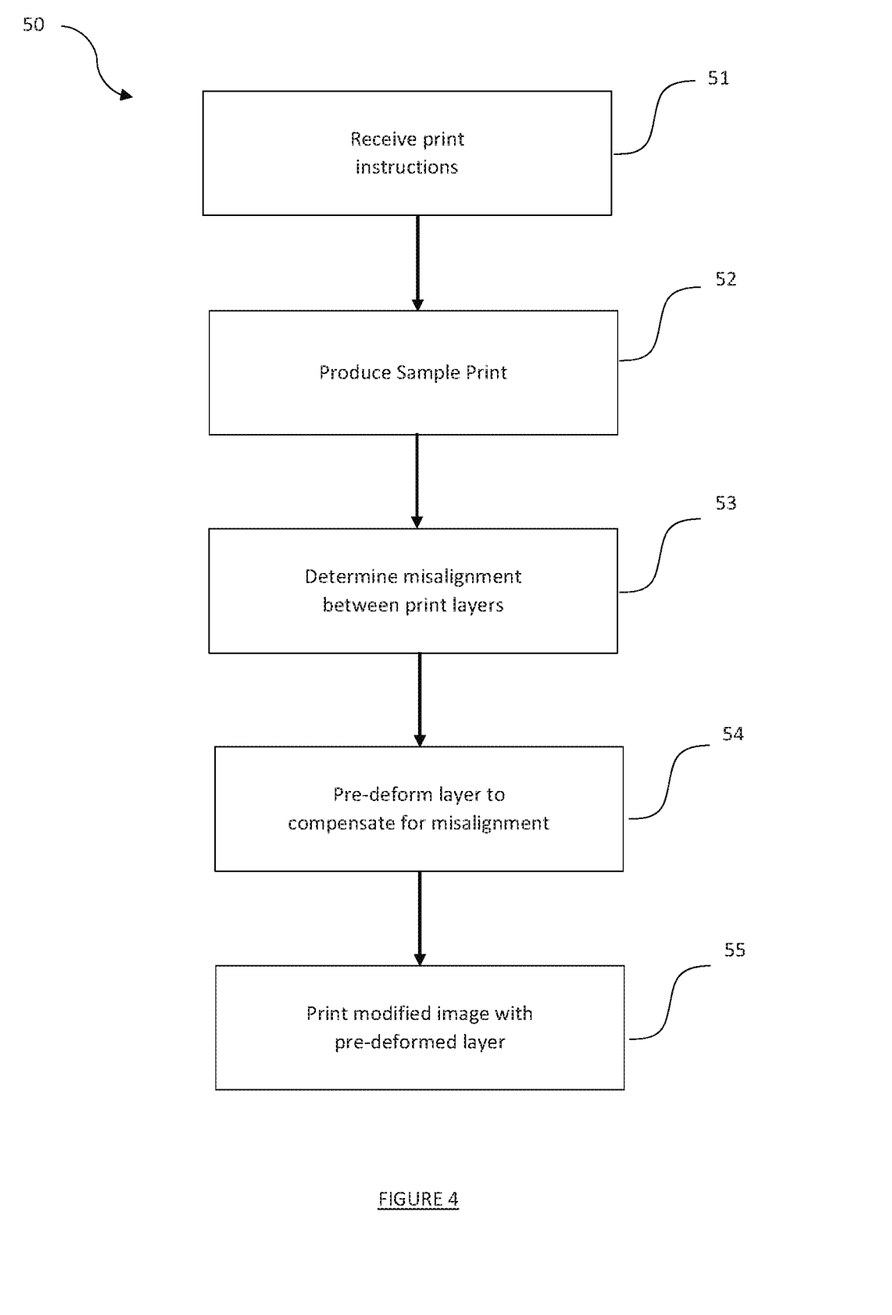
FIG. 4 is a flow chart of a method in accordance with an example.

As shown in the example flow chart of FIG. 4, the method comprises receiving a set of print instructions in block 51 (for example from a print server or a local or networked computer) and initially producing a sample print in block 52. The sample print may be produced with the same printing parameters (for example the same media substrate and same printer) as the intended final print. In block 53 any misalignment between the layers of the print is determined. For example, as shown in FIG. 3, the misalignment of the superpositioned layers can be calibrated or quantified at a plurality of locations (for example nodes A through F in FIG. 3). The method may then use the misalignment data from the sample print in a morphing program (as explained further with regard to FIG. 6 below) to provide a modified digital image in block 54. The modified image has one of the layers pre-deformed to compensate for the misalignment which occurred in the printing of the sample print. This modified image may then be used to print the digital image in block 55.

By using misalignment from a sample print in the pre-deformation of the image examples of the present disclosure may compensate for physical deformation which occurs during the print process. For example, the pre-deformed image may compensate for deformation which occurs between the printing of the layers from staggered print heads (as illustrated for example in FIG. 2). The pre-deformation of the image layer may be non-uniform across the axis of the image. For example, the deformation may compensate for deformation with respect to one or more of the image or media axis, print time and media consumption.

Figure 5:
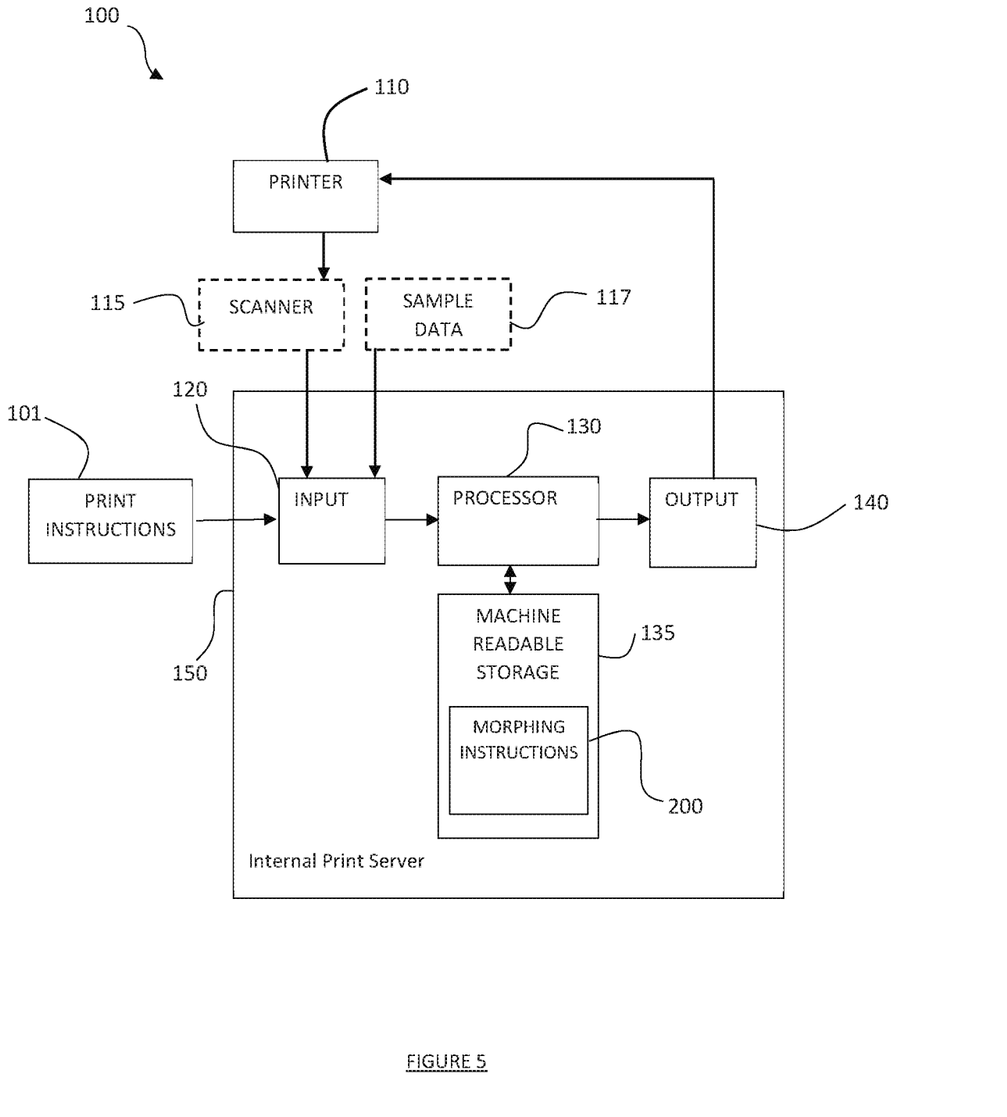
FIG. 5 is an apparatus for use in an example.

An example apparatus for implementing the disclosure is shown in FIG. 5. The apparatus 100 includes a printer 110 and an associated processor 130. The processor may be part of an internal print server 150. An input 100 is associated with the processor 130 for receiving print instructions 101. An output associated with the processor communicates with the printer 110. The input 120 can also receive data relating to the misalignment of ink layers. A scanner 115 may be provided which can be used to receive sample prints from the printer 110 and capture misalignment data related to ink layers in the print for providing to the input 120. Alternatively, sample misalignment data 117 may be captured externally to the apparatus 100 (for example through a manual calibration with resulting data provided to the input). The processor 130 may use the misalignment data and the original print instructions in a morphing process based upon instructions 200 stored on a machine readable medium 135. The process may, therefore, provide a modified image in which at least one of the print layers 10 and 20, for example the white underflood or overflood layer, is pre-deformed to compensate for misalignment. This modified image may be transmitted to the printer 110 via the output 140 for printing the final image or batch of images.

Figure 6:
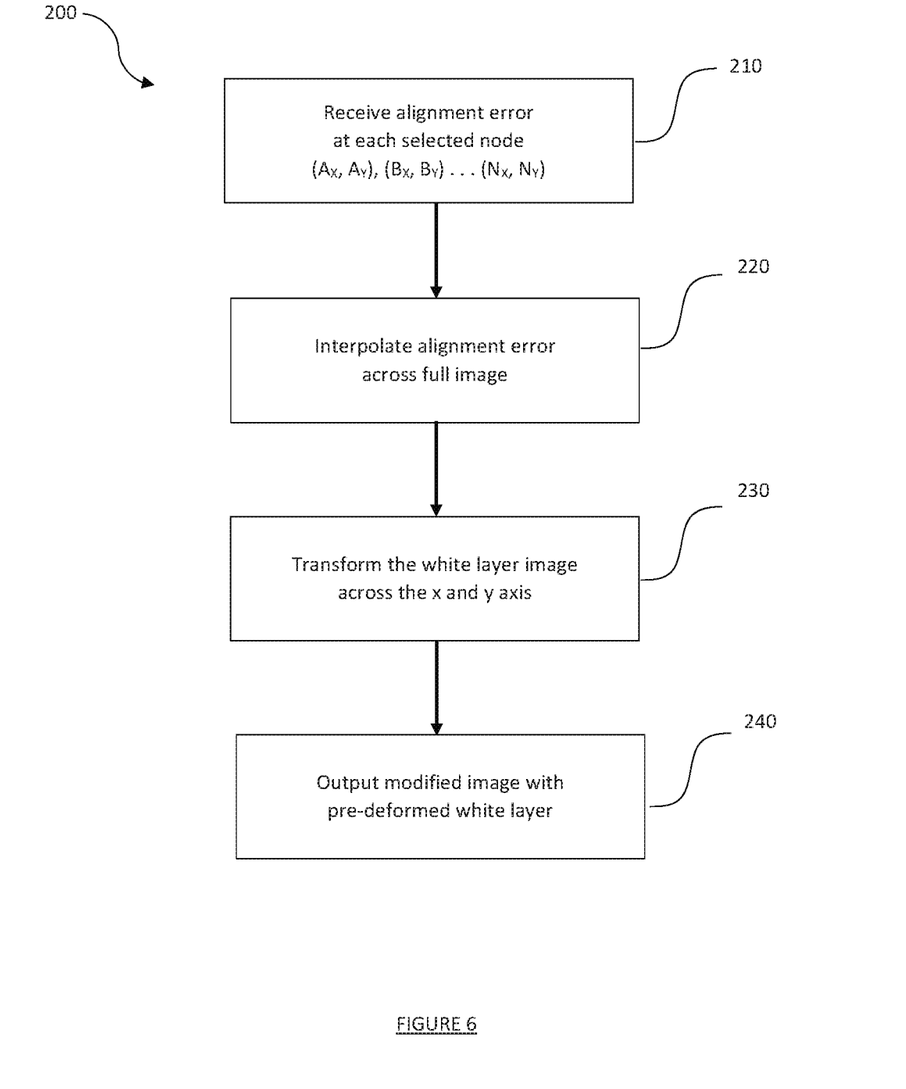
FIG. 6 is an example flow chart of an image morphing routine for use in examples.

The morphing process performed by the processor 130 will be explained in further detail with reference to the process flow chart of FIG. 6. The process 200 may be part of a set of instructions on a machine-readable storage medium 135 and executable by the processor 130. The machine-readable storage medium may, for example, be a part of the internal print server 150 of the apparatus 100. In the first block 210 of the process alignment data for a plurality of nodes across the image are received.

The nodes may for example be evenly distributed about the image as shown by points A to F of FIG. 3. For each mode a misalignment value in an x and y plane may be obtained such that values for each node are recorded as $(A_X, A_Y) (B_X, B_Y)$ through to the final node $(N_X, N_Y)$. In block 220 the process interpolates the alignment error across the full image using the received values. It will be appreciated that numerous methods may be used for interpolating intermediate points and that the resolution of the interpolated points may be selected depending upon the processing time and/or the final accuracy of the print which is considered acceptable to the end user.

With the misalignment interpolated across the image the process may, in block 230, apply a transformation to a layer (for example the white layer) of the image to reduce, minimize or remove the misalignment of the layers. For example, the layer may be selectively stretched, shrunk or translated to compensate for the misalignment found or interpolated in the sample print. By using the measured and/or interpolated values of the misalignment the transformation performed in block 230 need not be limited to a uniform transformation across the image and can vary across selected regions and/or along one or more of the axis of the image. In block 240 a modified image is output with at least one layer (for example the white underflood or overflood layer) pre-deformed to compensate for any misalignment of the layers found in the sample print. Thus, the final print can be executed using the pre-deformed image which compensates for expected physical deformation which might occur between the printing of layers of superpositioned pixels.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of digital printing comprising:
   providing a digital image to be printed having at least one region having pixels comprising superpositioned layers of a first ink and a second ink;
   producing at least one sample print;
   calibrating misalignment of the superpositioned layers at a plurality of calibration locations on the sample print;
   providing misalignment data to a morphing program to pre-deform the digital image to provide a modified digital image which compensates for misalignment during printing; and
   printing using the modified digital image.

2. A method as claimed in claim 1, wherein the morphing program interpolates the misalignment of the image between calibration locations.

3. A method as claimed in claim 1, wherein the morphing program compensates for physical deformation of the print media.

4. A method as claimed in claim 1, wherein the morphing program applies a non-uniform deformation to the image to compensate for physical deformation occurring with respect to one or more of: image or media axis, print time and media composition.

5. A method as claimed in claim 1, wherein the first ink layer is a white ink layer and the second ink layer is a color ink layer, the white ink layer providing an overflood or underflood for the color ink layer.

6. A method as claimed in claim 1, wherein the first ink layer and second ink layer are printed by non-aligned print heads.

7. An apparatus comprising:
an input for receiving misalignment data from a sample print of a digital image, said misalignment data being indicative of a misalignment of a first ink and a second ink at a plurality of locations on the sample print in which pixels of both the first and second ink are formed as superpositioned layers;
a processor to:
use said misalignment data to determine misalignment across the sample print of the digital image; and
pre-deform the digital image to provide a compensate for the misalignment in the superpositioned layers;
an output to provide print instructions to a digital printer to print the pre-deformed digital image.

8. An apparatus as claimed in claim 7, wherein the apparatus further comprises a scanner for capturing misalignment data from the sample print and providing resulting data to the sample print.

9. An apparatus as claimed in claim 7, wherein the apparatus further comprises a digital printer and wherein the digital printer comprises at least a first print head to deliver the first ink and at least a second print head to deliver the second ink, wherein the print head to deliver the first ink and the print head to deliver the second ink are positioned in a staggered configuration relative to the print medium.

10. An apparatus as claimed in claim 9, wherein the at least a first print head to deliver the first ink comprises a plurality of aligned color print heads.

11. An apparatus as claimed in claim 10, wherein the print head to deliver a second ink comprises at least one white ink print head.

12. An apparatus as claimed in claim 7, wherein the apparatus comprises a print server, the print server including the processor.

13. A non-transitory machine-readable storage medium comprising instructions executable by a processor to:
receive print layer alignment data related to alignment measurements of a first ink layer and a second ink layer at a plurality of locations on a sample print of a digital image;
use said print layer alignment data to determine misalignment of the print layers across the sample print; and
apply a morphing routine to the digital image to compensate for the misalignment of the layers across the digital image; and
output a modified digital image to a printer.

14. A non-transitory machine-readable storage medium as claimed in claim 13, wherein the instructions are further executable by a processor to:
interpolate the alignment of the print layers at a plurality of points intermediate to the plurality of locations; and
update the print layer alignment data to include said interpolated alignment data.

15. A non-transitory machine-readable storage medium as claimed in claim 13, wherein applying a morphing routine comprises a non-uniform pre-deformation of a white layer of the image to compensate for the misalignment identified in the sample print.

* * * * *